Oct. 31, 1944.   A. W. EVANS   2,361,388
POWER WINCH
Filed Jan. 19, 1943   4 Sheets-Sheet 3

Inventor
A. W. Evans
By Mason Fenwick & Lawrence
Attorneys

Oct. 31, 1944.   A. W. EVANS   2,361,388
POWER WINCH
Filed Jan. 19, 1943   4 Sheets-Sheet 4

Inventor
A. W. Evans
By Mason Fenwick & Lawrence
Attorneys

Patented Oct. 31, 1944

2,361,388

UNITED STATES PATENT OFFICE 2,361,388

POWER WINCH

Alfred W. Evans, Gloucester, Va.

Application January 19, 1943, Serial No. 472,893

10 Claims. (Cl. 254—187)

This invention relates to power winches of the heavy duty type adapted to be mounted on a mobile source of motive power, and designed to include variable speed mechanism, and to be capable of moving tremendous loads.

Although the winch of the present invention is adapted for any purpose for which winches are used, it was developed primarily for field service in clearing timber land. It is particularly adapted for use as the power unit referred to in my co-pending application Serial No. 470,619, filed December 30, 1942, for Method and means for clearing land of trees. As disclosed in that application, the power unit, in conjunction with other equipment, pulls entire tree from the ground; discarding former methods which involved cutting the log and then digging or blasting out the stump. It can be used under almost all conditions, in swamps, ravines, and on mountain sides, floats, etc., where other mechanism lacking a straight-line, slow controlled pull could not be adapted for use. Great power is required to topple a living tree of any size, and the stresses imposed upon the pulling unit are enormous.

The above-mentioned application discloses a method of pulling a tree whereby the tree is first twisted to loosen the roots from the earth before the tree is pulled over. It takes into consideration the fact that a tree is a living thing, and that its roots when flexed will, if given the opportunity, attempt to straighten out. When the trunk has been turned slightly, the large roots in straightening will pull the small roots and tendrils loose from the soil. By alternately twisting the tree and then holding it tensioned, the roots will materially aid in breaking the bonds between roots and earth and thus reduce the pulling force necessary to topple the tree. Great care must be exercised in the initial twisting to prevent snapping the trunk or twisting off one or more of the roots, and yet when the roots have been sufficiently loosened it is advantageous to pull the tree over quickly.

The object of the present invention is to provide a power winch, to be mounted upon a tractor or other mobile source of motive power, which develops great power and is equipped with control means to adapt it to act as the power unit in carrying out the above-described method.

Another object is to provide a power unit in which the driving force is divided to apply the power to the winch drum at spaced points about its periphery to reduce the torque upon the driving members and distribute the stress upon the driven member.

A further object of the invention is to provide a power unit which includes dual transmission mechanism to permit a plurality of speed ratios to be selectively controlled by the operator.

A still further object of the invention is to provide such a unit in which the entire device, winch and mobile unit to which it is attached, may be anchored in position during the operation of the winch, the anchoring means being attached to the winch frame in such manner that torque strains upon the winch will be materially reduced, and the mobile carrying unit will bear no part of the pulling load.

Other objects will become apparent as the following specification proceeds, and from the drawings which accompany and form a part of this specification and in which like reference numerals indicate like parts throughout.

Figure 1:
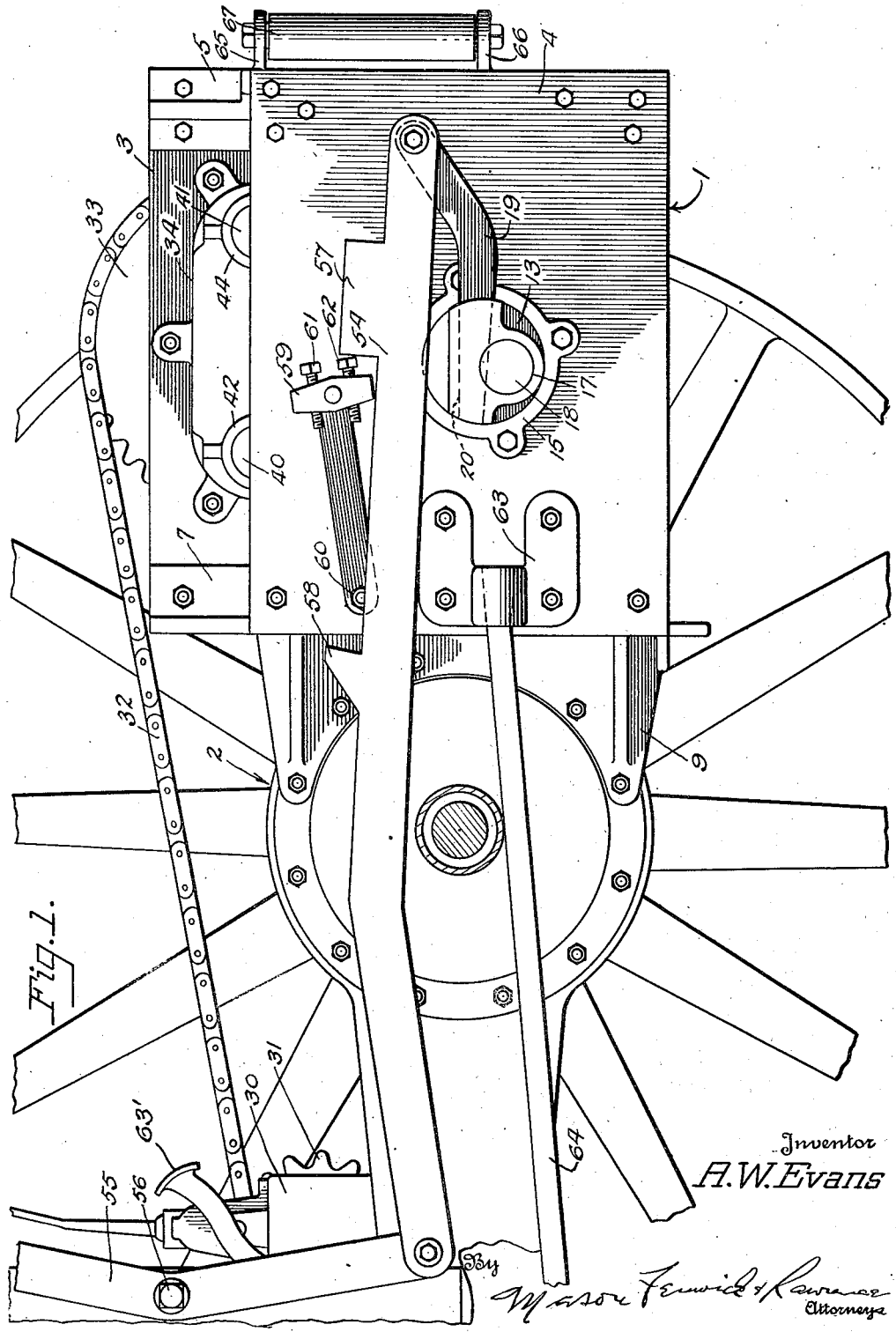
Figure 1 is a side elevational view of a power winch embodying the principles of the present invention as attached to a mobile carrying unit, in this instance a tractor, a part only of the tractor being shown.
Figure 2:
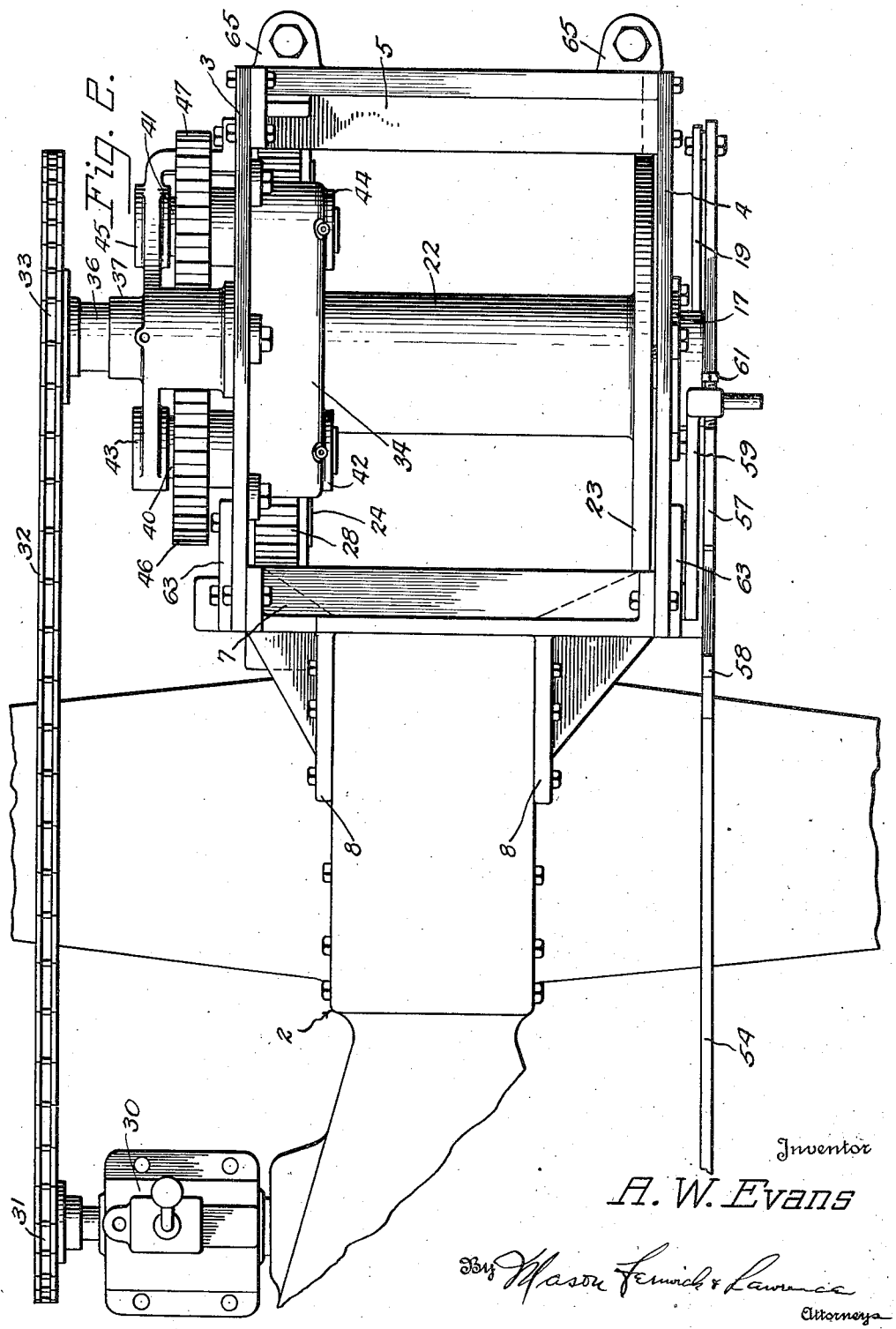
Figure 2 is a top plan view of the device shown in Figure 1.
Figure 3:
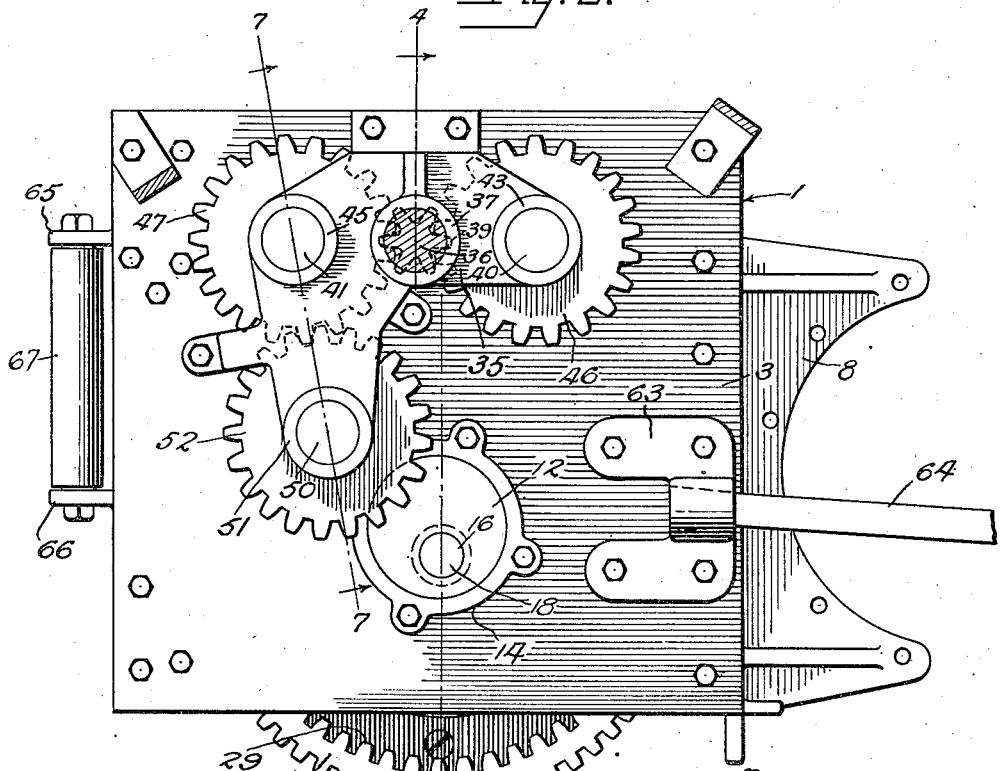
Figure 3 is a view of the opposite side of the winch to that shown in Figure 1, the driving sprocket being removed.
Figure 4:
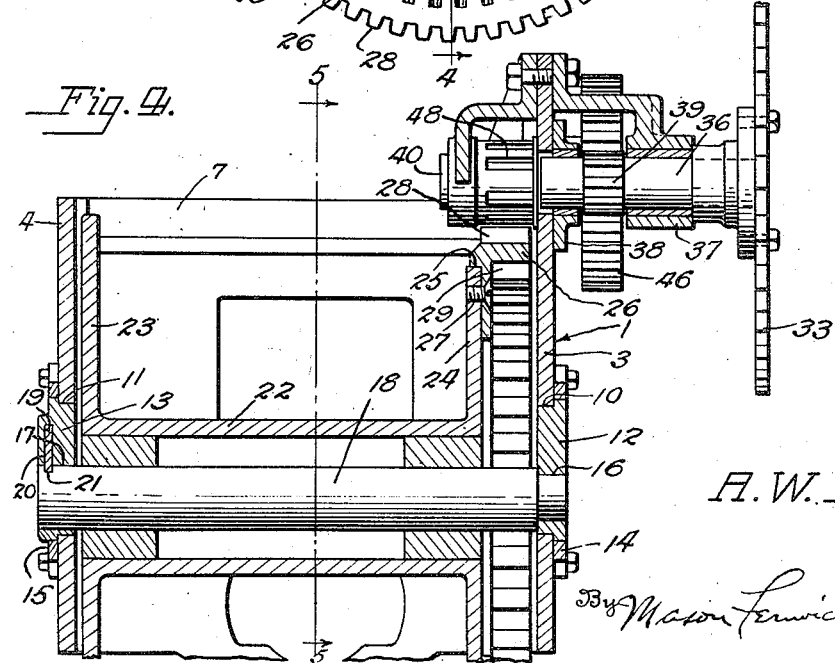
Figure 4 is a vertical sectional view taken on the line 4—4 of Figure 3.

Referring to the drawings in detail, 1 indicates the power winch and 2 a tractor or other source of mobile motive power, only the rear portion of the tractor being shown. The winch consists of two rectangular side plates 3 and 4, held spaced apart by the rear cast brackets 5 and 6, the bracket 5 being at the top and the bracket 6 at the bottom, and are bolted to the side plates. At the front, a bracket 7, co-extensive with the height of the plates, extends the full width between the plates and is bolted thereto by lines of bolts extending along the front edges of the plates. The bracket 7 has two forwardly projecting arcuate flanges 8 and 9 to fit around the differential housing of the tractor on opposite sides and be fastened to the differential housing by means of the housing bolts. The bracket 7 is heavily constructed and well gussetted to support the weight of the winch.

Substantially midway between front and back, the side plates 3 and 4 are provided with openings 10 and 11 to receive eccentrics 12 and 13, mounted to rotate in bushings 14 and 15 bolted to the outside of the plates. The eccentrics have openings 16 and 17, offset from the center of the eccentrics, into which the respective ends of the drum shaft 18 fit. The shaft is locked into place by means of the eccentric lever 19 which passes through a slot 20 in a boss raised from the eccentric 13, the lever 19 seating in a groove 21 formed in the shaft 18.

A cable drum 22 having flanges 23 and 24 is rotatably mounted on the shaft 18 between the plates 3 and 4. Flange 24 is of less diameter than flange 23, and fits into a recess 25 formed in the face of an internal-external ring gear 26 and is secured to the gear by screws 27. The ring gear is provided with external teeth 28 and internal teeth 29 for selective engagement with gear trains of different ratio for various speeds.

Connected to the outer end of the usual power take-off of the tractor is a variable speed transmission 30, and on the driven shaft of the transmission a sprocket 31 is mounted. Sprocket chain 32 passes around sprocket 31 to drive a sprocket 33 on the winch. Brackets 34 and 35, bolted respectively to the upper inside and outside faces of the side plate 3, co-operate to provide bearings for the ends of the various drive shafts.

The primary drive shaft 36 is supported in bearing 37 carried by the outside bracket 35 and bearing 38 on the plate 3. A pinion 39 is formed integral with the shaft in such manner that the ends of each tooth projects beyond the periphery of the shaft while the base of the tooth is cut into the shaft to provide a gear of great strength. Sprocket 33 is mounted on the outer end of shaft 36 to impart rotation to the shaft.

Similar shafts 40 and 41 are mounted in bearings 42 and 43 and 44 and 45, respectively, in the inner and outer brackets, and have formed thereon gears 46 and 47 meshing on opposite sides with the pinion 39 on the primary drive shaft. Pinions 48 and 49 are cut into the shafts 40 and 41, the teeth of the pinions being entirely within the periphery of the shafts. Pinions 48 and 49 are located on that portion of the shafts which lie between the inner face of the side plate 3 and the bearings 42 and 44, and in the same vertical plane as the internal-external ring gear 26.

Below the shaft 41 another shaft 50 is journalled in the outer bracket at 51. This shaft is provided with a gear 52 on the outside of the plate in mesh with gear 47, and a gear 53 on the inside of the plate in the same vertical plane as the internal-external ring gear 26.

Figure 5:
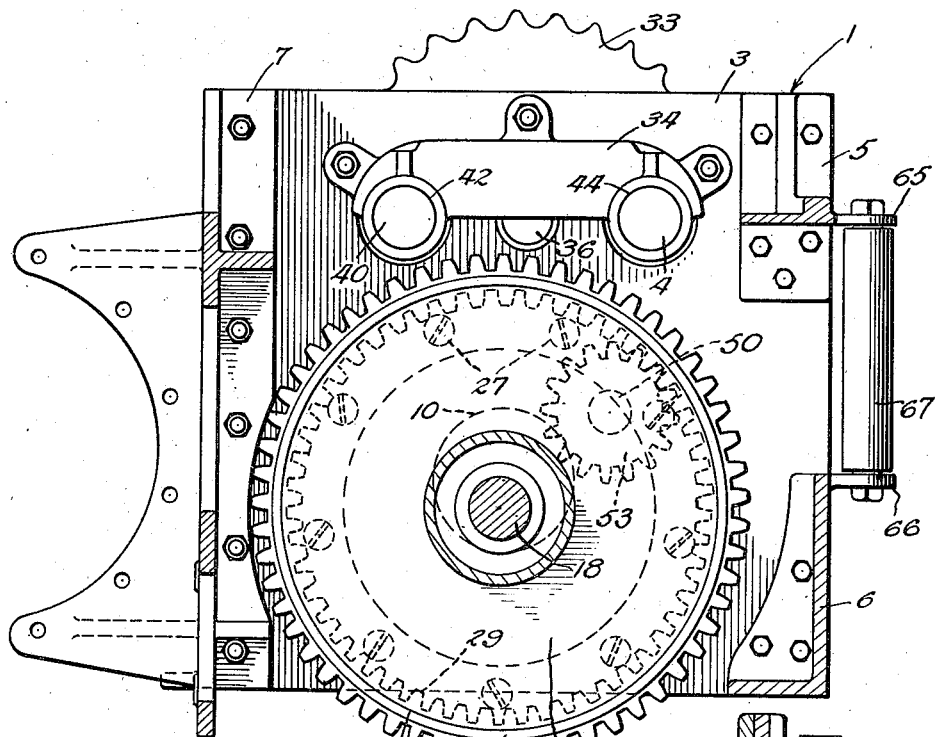
Figure 5 is a vertical section taken on the line 5—5 of Figure 4.
Figure 6:
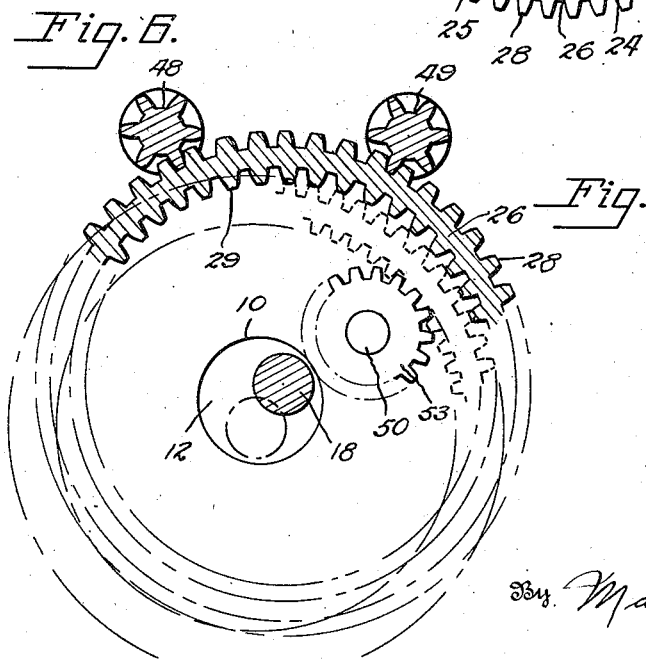
Figure 6 is a view of the gearing shown in Figure 5 as shifted to its other or low speed position.
Figure 7:
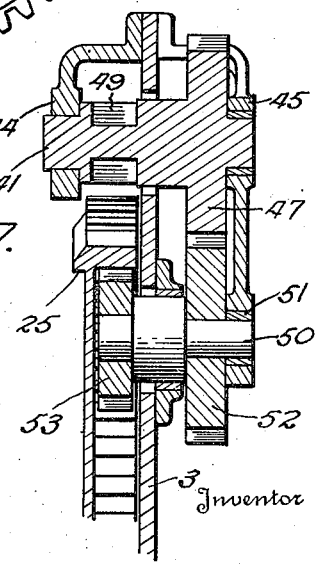
Figure 7 is a section taken on the line 7—7 of Figure 3.

The cable drum 22, being mounted on the shaft 18 fixed in the eccentrics 12 and 13, may be raised or lowered on an arc if the eccentrics are rotated. Rotation of the eccentrics in a counter-clockwise direction, as viewed in Figures 1, 5 and 6, will lift the drum and its attached ring gear 26 to cause the external teeth 28 of the ring gear to mesh with the pinions 48 and 49 on the shafts 40 and 41. This is the low speed position of the winch. Figures 1, 5 and 6 show the drum and eccentrics after having been rotated in a clockwise direction, and the drum has been lowered permitting the internal teeth 29 of the ring gear to mesh with the gear 53 on the shaft 50. This is the high speed position.

To shift the eccentrics to change the position of the drum and ring gear and change the speed and pulling power of the winch, a link 54 has one end pivotally connected to the outer end of the eccentric lever 19 and its other end pivotally connected to the bottom of a hand-operating lever 55, which is pivoted between its ends as at 56. The link 54 is provided with upstanding lugs 57 and 58 to be engaged by a dog 59 which acts as a stop to limit the movement of the control levers and lock the drum in position. The dog is pivoted to the plate 4, as at 60 and is provided with set screws 61 and 62 which may be adjusted to determine the position in which the drum will be locked. This permits variation in the amounts of movement of the drum to assure a proper mesh between the various gears and to adjust for wear.

In operation the handle 55 is pushed forward and the dog 59 dropped backward to engage the left-hand side of lug 57 as is shown in Figure 1 to lock the drum in lowered or high speed position. The power take-off transmission is shifted into high speed and the clutch pedal 63' operated to engage the clutch. The entire power unit is then in high gear and cable may be wound upon the drum 22 rapidly under control of the motor speed of the tractor. When the line is about taut and before heavy pulling is commenced, the clutch is released, the handle 55 pulled back and the locking dog dropped forward, engaging the right-hand side of lug 57, the transmission 30 shifted into low and the clutch reengaged. The winch is then in low speed and ready for heavy pulling. At any time it is desired, the load may be held immovable by depressing the clutch pedal sufficiently to permit slippage of the clutch. In this way periods of pull may be alternated with periods of rest during which the load is held under tension. By releasing the tractor clutch and shifting the power take-off transmission into neutral, the cable drum will be released and the cable may run off freely.

It will be noted that the low speed gearing is designed and arranged for great strength and to develop tremendous power. The primary drive shaft is centrally located and the pinion 39 in mesh with gears 46 and 47 to balance the strain upon the shaft 36. The two pinions 48 and 49 mesh with the ring gear at points which are spaced apart around the periphery of the ring gear to equally distribute the stresses imposed on the gears. This distribution of power and stresses permits greater driving power to be employed, and, at the same time, permits each of the gears to act as a balanced lever for the full development of all leverage power of which the gears are capable. Further, in driving the ring gear at spaced points, each gear acts somewhat in the nature of a pawl or a stop to relieve the load of the other, similar to the dogs of a lever-operated jack.

Near the forward edge, on the outside of each side plate, and substantially in horizontal alignment with the center of rotation of the eccentrics, an anchor clip 63 is bolted. One end of a cable loop 64, as shown in the above-mentioned co-pending application, is attached to the clip to which loop a choker line may be hooked to anchor the unit to a tree or other anchoring means. The anchor cable 64 is entirely free from the tractor so that the entire pulling strain is through the winch. By having the anchor clips substantially on the same horizontal plane as the center of the cable drum the pulling strain through the winch will be a straight line pull, thus preventing all torque or twisting strain on the winch. This is a decided advantage in another way as it eliminates the necessity for use of a "Sampson" permitting operation of the unit in small spaces. This also permits the use of a much lighter unit than would otherwise be necessary, which greatly facilitates transportation into jungles, swamps, etc., where usual means of transportation are not available or cannot be used.

The force transmission from the anchor to the tree to be pulled, or whatever weight is to be moved, is so great in most instances, that the weight of the tractor and winch will become negligible and the entire unit shifted, bringing it into alignment with the anchor and object to be moved. If the line of force is at an upward angle the tractor and winch will be lifted from the ground to preserve the straight line pull. To protect the cable in the event the tractor is laterally out of alignment, the upper and lower rear brackets 5 and 6 are provided with rearwardly extending ears 65 and 66, respectively, between which are mounted the vertical rollers 67. In the event of angular deflection, the cable may pass smoothly over one of the rollers until such time as sufficient force has been placed upon the line to move the unit laterally into its proper position of alignment.

The winch has been shown and described as being mounted on a tractor or other mobile device, but it will function equally as well as a winch, and to as good advantage, if mounted on a stationary platform with any suitable source of power. Aside from the winch itself, all that is needed is a source of power, a transmission on the source of power, and a clutch or similar coupling mechanism by means of which the load may be held immovable whenever desired.

Although a preferred and practical embodiment of the invention has been illustrated and described, it is to be understood that changes may be made from the precise structure shown without departing from the spirit of the invention so long as it is within the scope of the claims.

What I claim is:

1. A winch adapted to be operatively connected to a source of power having a variable speed transmission and a releasable power coupling comprising, a flanged cable drum, an internal-external gear carried by a flange of said cable drum, a high speed drive and a low speed drive, and means to shift said cable drum to selectively engage the internal-external gear with said high and low speed drives.

2. In a power winch, a flanged cable drum, an internal-external gear carried by a flange of said drum, a high speed drive and a low speed drive, and means to shift said cable drum to selectively engage the internal-external gear with said high and low speed drives.

3. In a power winch, a flanged cable drum, an axle for said cable drum, said axle being mounted in eccentrics, an internal-external gear carried by said cable drum, a high speed drive and a low speed drive, and means to impart a partial rotation to said eccentrics to cause the cable drum and ring gear to move on an arc to selectively engage said high and low speed drives.

4. In a device as claimed in claim 3, means to lock the drum in its high and low speed positions.

5. In a power winch, a flanged cable drum, an axle for said cable drum, said axle being mounted in eccentrics, an internal-external gear carried by said cable drum, a high speed drive and a low speed drive, a pivoted hand lever and link members between said hand lever and one of said eccentrics to impart a partial rotation to said eccentrics to cause the cable drum and ring gear to move on an arc to selectively engage said high and low speed drives.

6. A device as claimed in claim 5, in which one of the link members is provided with upstanding lugs, and a pivoted dog to be swung to engage the lugs to lock the drum in its high and low position.

7. In a power winch, a cable drum, a gear carried by said drum, a primary drive, power take-off shafts at either side of said primary drive receiving power from said primary drive, gears carried by said power take-off shafts to mesh with the gear carried by the cable drum at spaced points less than 180° apart on the periphery of said gear to rotate the drum, and means for effecting relative movement between said gears.

8. In a power winch, a cable drum, a gear carried by said drum, a primary drive shaft, a gear on said shaft, power take-off shafts on either side of the primary shaft, a gear on each take-off shaft to mesh with the gear on the primary drive shaft, a second gear on each take-off shaft positioned in the same vertical plane as said cable drum gear to mesh with said gear at spaced points less than 180° apart on its periphery to rotate the drum, and means for effecting relative movement between said gears.

9. In a power winch, a cable drum, an internal-external ring gear carried by said drum, a primary drive shaft, low speed power take-off shafts at either side of the primary drive shaft receiving power from said shaft, a high speed power take-off shaft driven from one of said low speed shafts, a gear on each of said low speed power take-off shafts in the same plane as the internal-external ring gear and outside the periphery of said ring gear, a gear on said high speed take-off shaft in the plane of the ring gear and inside the periphery of said ring gear, and means to shift the cable drum and ring gear to simultaneously engage the gears on said low speed take-off shafts to put the winch in low gear and to shift the drum and ring gear to engage the gear on said high speed power take-off shaft to put the winch in high gear.

10. A device as claimed in claim 9, in which said cable drum is mounted on an axle, said axle mounted in eccentric bearings, and means to impart partial rotation to the eccentric bearings to cause the drum to move on an arc to high and low speed position.

ALFRED W. EVANS.